(12) United States Patent
Prather et al.

(10) Patent No.: US 8,458,056 B1
(45) Date of Patent: Jun. 4, 2013

(54) DETERMINING CRITERIA FOR SELECTING A DONOR VEHICLE CONTAINING A NON-INDEXED AUTO PART

(75) Inventors: Jody Prather, Burlington, KY (US); Robert S. Cohen, Brooklyn Park, MN (US)

(73) Assignee: Used-Car-Parts.com, Inc., Fort Wright, KY (US)

( * ) Notice: Subject to any disclaimer, the term of this patent is extended or adjusted under 35 U.S.C. 154(b) by 1607 days.

(21) Appl. No.: 11/613,870

(22) Filed: Dec. 20, 2006

(51) Int. Cl.
*G06F 17/50* (2006.01)
*G06Q 40/00* (2006.01)
*G06Q 10/00* (2012.01)

(52) U.S. Cl.
USPC .................................. 705/29; 705/4; 705/28

(58) Field of Classification Search
None
See application file for complete search history.

(56) References Cited

U.S. PATENT DOCUMENTS

| 2005/0125261 A1* | 6/2005 | Adegan ........................... 705/4 |
| 2005/0187834 A1* | 8/2005 | Painter et al. .................. 705/28 |
| 2006/0167717 A1* | 7/2006 | Desenberg ...................... 705/1 |

\* cited by examiner

*Primary Examiner* — Mussa A Shaawat
(74) *Attorney, Agent, or Firm* — Wood, Herron & Evans, LLP

(57) ABSTRACT

An apparatus, program product and method to determine criteria for selecting a donor vehicle containing a non-indexed auto part are provided. An index of interchangeable auto parts is utilized to determine the criteria by relying on the interchangeability of indexed auto parts. Once determined, donor vehicles matching the determined criteria may have a higher probability of containing a non-indexed auto part sought by a customer.

41 Claims, 4 Drawing Sheets

DETERMINING CRITERIA FOR SELECTING A DONOR VEHICLE CONTAINING A NON-INDEXED AUTO PART

FIELD OF THE INVENTION

The invention relates to computers and Inventory Management Systems and in particular, determining criteria for selecting a donor vehicle containing a non-indexed auto part that is interchangeable with a part on a donee vehicle, but is not included in an index of interchangeable auto parts.

BACKGROUND OF THE INVENTION

Automotive recyclers typically purchase vehicles at vehicle auctions and sell the auto parts of the purchased vehicles. Once purchased, the automotive recyclers typically use an Inventory Management System such as Hollander, Checkmate, Pinnacle, Fast Parts, or Powerlink to maintain data about the auto parts. Among other functionality and components, Inventory Management Systems typically include a database, and automotive recyclers enter data (e.g., a price, etc.) about each auto part in the fields of the Inventory Management System. Similarly, automotive recyclers may access the data stored in their Inventory Management System about the auto parts to sell the auto parts.

The sale of recycled auto parts has traditionally been facilitated by the Hollander Interchange Index. In particular, some auto parts, typically those that are sold most frequently, have been studied and assigned an Interchange Number in the Hollander Interchange Index. Generally, auto parts with the same Interchange Number are interchangeable with each other. In particular, auto parts with the same Interchange Number may be identical, but have different years or models. For example, if the wheel of a 1995 Chevrolet Cavalier and the wheel of a 1996 Chevrolet Cavalier are interchangeable, both wheels may be assigned the same Interchange Number (e.g., 12345). Similarly, the same Interchange Number may be assigned to auto parts with different makes that are interchangeable. To use the same example, if the wheel of a 1995 Pontiac Sunfire or the wheel of a 1996 Pontiac Sunfire are interchangeable with the wheel of a 1995 Chevrolet Cavalier or a 1996 Chevrolet Cavalier, then the Interchange Number of 1995 and 1996 Pontiac Sunfire wheels may also be the same (i.e., 12345).

Additionally, an auto part can also be interchangeable with another auto part but yet the two auto parts may have different interchange numbers (e.g. 12345a and 12345b or 12345 and 67890). This may happen when a part will fit the application, but there may be a subtle difference in appearance or some physical characteristic that makes it slightly different but the auto part will still fit and work for the application.

Nonetheless, if a customer wishes to purchase a wheel for a 1995 Pontiac Sunfire from an automotive recycler, the automotive recycler may search for a 1995 Pontiac Sunfire wheel in his or her Inventory Management System, and if the Inventory Management System uses the Hollander Interchange Index, the Inventory Management System will determine the interchangeability of a 1995 Pontiac Sunfire wheel based on the Interchange Numbers and display a list of all the wheels that are interchangeable with a 1995 Pontiac Sunfire wheel on the recycler's computer screen. Once displayed, the customer may select one of the Interchangeable wheels (e.g., based on price), the selected part can be retrieved, and the recycler can finalize the sale with the customer. Due to the indexing, the recycler may be able to meet the customer's requirement not only with a 1995 Pontiac Sunfire wheel, but also with a wheel interchangeable with a 1995 Pontiac Sunfire wheel.

However, not all auto parts are indexed (i.e., assigned an Interchange Number) under the Hollander Interchange Index. Generally, auto parts that are not as frequently requested by customers may not be indexed. Non-indexed auto parts, which are sometimes referred to as Non Interchange auto parts, may not be indexed for any years, models, nor makes. Auto parts such as windshield washer bottles, ash trays, seats (e.g., front seats), speedometer cable, and rearview minors are typically not indexed.

As all auto parts are not indexed, automotive recyclers and customers may experience difficulties in selling and purchasing, respectively, non-indexed auto part. For example, if a customer wants to purchase from a recycler a windshield washer bottle from a 1995 Pontiac Sunfire, the recycler may search for 1995 Pontiac Sunfire windshield washer bottles in his or her Inventory Management System. However, as windshield washer bottlers are generally not indexed, and therefore do not have Interchange Numbers, the Inventory Management System will typically only search for 1995 Pontiac Sunfire windshield washer bottles. Only 1995 Pontiac Sunfire windshield washer bottles, if the recycler has any in the database of his or her Inventory Management System, will be displayed. As windshield washer bottles are a non-indexed auto part, the Hollander Interchange Index cannot be used to determine windshield washer bottles that may be interchangeable with a 1995 Pontiac Sunfire windshield washer bottle and none will be displayed even if the recycler has such an interchangeable windshield washer bottle. As a result, the recycler may not be able to sell an auto part that would indeed satisfy the customer's request, generally reducing the recycler's profitability. Furthermore, the customer may have to waste more time and resources contacting other recyclers, whom may experience the same difficulties as the first recycler, to purchase the auto part.

In some instances, the recycler may rely on experience to try to determine which auto parts may be interchangeable with a non-indexed auto part. Referring to the example above, if the recycler does not have any 1995 Pontiac Sunfire windshield washer bottles, a more experienced recycler may rely on his experience to make educated guesses as to which other windshield washer bottles may be interchangeable with a 1995 Pontiac Sunfire windshield washer bottle. As such, the recycler may decide to search for 1996 Pontiac Sunfire windshield washer bottle and/or 1997 Pontiac Sunfire windshield washer bottle, etc. If none of these are available in his or her inventory, he may continue to search for other vehicles that the recycler thinks may be interchangeable with a 1995 Pontiac Sunfire windshield washer bottle. However, this approach relies on experience, thus, less experienced recyclers may not have the benefit of this experience. Furthermore, the use of experience may be error prone and/or may omit some auto parts that may be interchangeable with non-indexed auto part.

In conclusion, the sale of non-indexed auto parts may pose challenges that indexed auto parts may not.

BRIEF SUMMARY OF THE INVENTION

The present invention provides a computer implemented method, an apparatus, and a program product that utilize an index of interchange auto parts to determine criteria that identify donor vehicles having parts that have a high probability of interchanging with other parts (e.g., requested parts) by using the interchange from at least one other indexed part. As such, the computer implemented method may be used to select a donor vehicle that matches the criteria. A donor vehicle matching the criteria may be more likely to contain a non-indexed auto part that is interchangeable with a part (e.g., a non-indexed auto part) of a donee vehicle. Thus, donor vehicles matching the determined criteria may have the highest probability of containing a non-indexed auto part sought by a user. Generally, the computer implemented method, apparatus, and program product provide a more systematic approach to identifying a vehicle with a non-indexed auto part that is interchangeable with another non-indexed auto part and may lead to the sale of more non-indexed auto parts and/or more satisfied customers.

In some embodiments consistent with the invention, at least one indexed auto part of a donee vehicle, wherein the at least one indexed auto part is included in an index of interchangeable auto parts may be selected, and said index of interchangeable auto parts may be utilized to determine criteria that identify donor vehicles having parts interchangeable with the at least one indexed auto part of the donee vehicle. The criteria may include at least one of a year designation, a make designation, or a model designation. In some embodiments, the at least one indexed auto part of a donee vehicle is the roof. Once the criteria is determined, a donor vehicle matching the criteria may be selected, and the non-indexed auto part from the donor vehicle may be selected.

These and other features and advantages, which characterize the invention, are set forth in the claims, drawings, and descriptive matter. For a better understanding of the invention, please see the claims, drawings, and descriptive matter.

DETAILED DESCRIPTION

The embodiments discussed hereinafter select at least one indexed auto part of a donee vehicle and utilize an index of interchangeable auto parts to determine criteria that identify donor vehicles having parts interchangeable with the at least one indexed auto part of the donee vehicle. A non-indexed auto part consistent with the invention may be practically any auto part that is not included in an index of interchangeable auto parts. For instance, an auto part not included in the index of interchangeable auto parts may be a non-indexed auto part. Generally, a non-indexed auto part may be practically any part for which there is no aggregation of data indicating which auto part or auto parts is interchangeable with it. On the other hand, an indexed auto part consistent with the invention may be practically any auto part that is included in an index of interchangeable auto parts. An index of interchangeable auto parts may be practically an aggregation of data indicating which auto part of auto parts are interchangeable and may include the Hollander Interchange Index.

Criteria consistent with the invention may be a year designation (e.g., 1995, 1996, etc.) and/or a make designation (e.g., Pontiac, Chevrolet, etc.) and/or a model designation (e.g., Sunfire, Cavalier, etc.). One or more year designations may be determined. One or more make designations may be determined. One or more model designations may be determined. Moreover, at least one of the three designations may be determined, but all three designations need not be determined. For instance, a make designation may be omitted when the make designation is evident from the model designation. Thus, at least one year designation only, or at least one make designation only, or at least one model designation only, or any combination of the three designations (e.g., at least one year designation and at least one model designation)(e.g., at least one of a year designation, at least one of a make designation, and at least one of a model designation) may be determined.

Additionally, a donor vehicle consistent with the invention may be practically any vehicle. A vehicle matching the criteria may be a donor vehicle. A vehicle matching the criteria may have a higher probability of having a non-indexed auto part that is interchangeable with a non-indexed auto part sought by a customer. A vehicle for which a customer is seeking an auto part for may be considered a donee vehicle.

Figure 1:
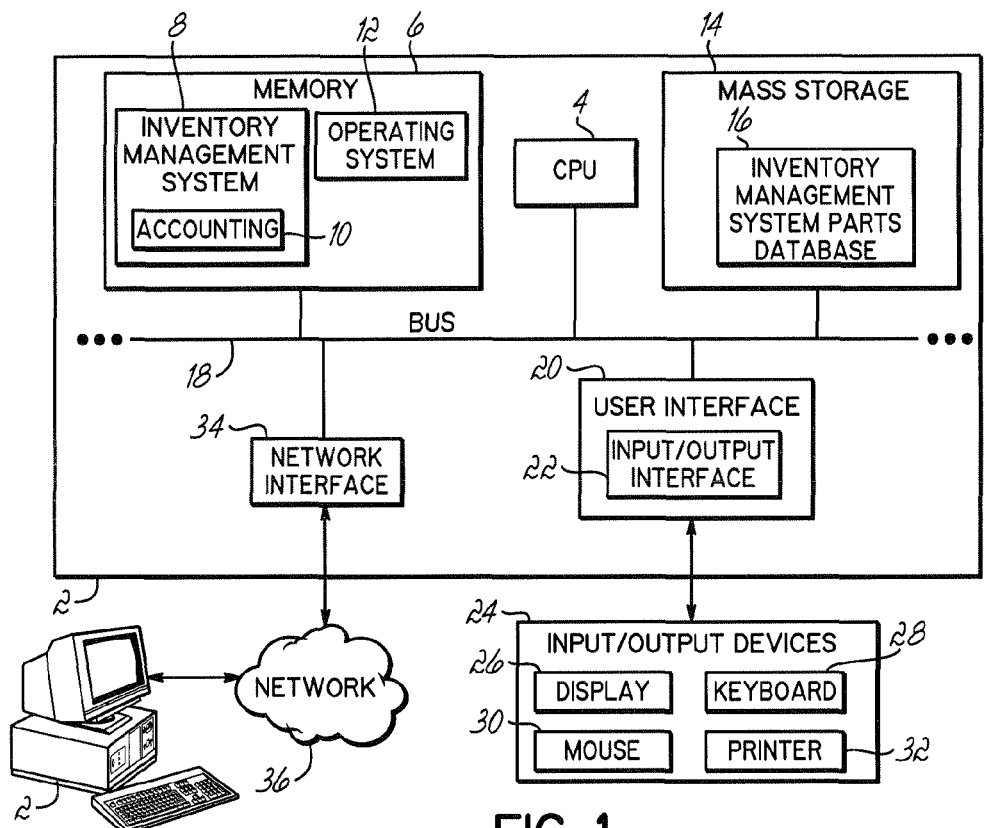
FIG. 1 is a block diagram of a networked computer system incorporating an Inventory Management System consistent with the invention.

Turning now to the Drawings, wherein like numbers denote like parts throughout the several views, FIG. 1 illustrates an exemplary hardware and software environment for an apparatus 2 consistent with the invention. For the purposes of the invention, apparatus 2 may represent practically any type of computer, computer system or other programmable electronic device, including a client computer, a server computer, a personal computer, a portable computer, a handheld computer, an embedded controller, etc. Moreover, apparatus 2 may be implemented using one or more networked computers, e.g., in a cluster or other distributed computing system. Apparatus 2 may be capable of functioning as a client and/or server in a client-server environment. Moreover, apparatus 2 may be capable of functioning as a client and/or server in a peer-to-peer environment. Multiple apparatus 2 may be interfaced in a client-server environment and/or peer-to peer environment. Apparatus 2 will hereinafter also be referred to as a "computer," although it should be appreciated that the term "apparatus" may also include other suitable programmable electronic devices consistent with the invention.

Computer 2 typically includes a central processing unit (CPU) 4 including one or more microprocessors coupled to a memory 6, which may represent the random access memory (RAM) devices comprising the main storage of computer 2, as well as any supplemental levels of memory, e.g., cache memories, non-volatile or backup memories (e.g., programmable or flash memories), read-only memories, etc. In addition, memory 6 may be considered to include memory storage physically located elsewhere in computer 2, e.g., any cache memory in a processor in CPU 4, as well as any storage capacity used as a virtual memory, e.g., as stored on a mass storage device 14 or on another computer coupled to computer 2.

Computer 2 also typically receives a number of inputs and outputs for communicating information externally. For interface with a user or operator, computer 2 typically includes a user interface 20 and/or an input/output interface 22 incorporating one or more user input/output devices 24 (e.g., a keyboard 28, a mouse 30, a printer 32, a trackball, a joystick, a touchpad, and/or a microphone, among others) and a display 26 (e.g., a CRT monitor, an LCD display panel, and/or a speaker, among others). Otherwise, user input may be received via another computer or terminal, e.g., via a client or single-user computer 2 coupled to computer 2 over a network 36. This latter implementation may be desirable where computer 2 is implemented as a server or other form of multi-user computer. However, it should be appreciated that computer 2 may also be implemented as a standalone workstation, desktop, or other single-user computer in some embodiments.

For non-volatile storage, computer 2 typically includes one or more mass storage devices 14, e.g., a floppy or other removable disk drive, a hard disk drive, a direct access storage device (DASD), an optical drive (e.g., a CD drive, a DVD drive, etc.), and/or a tape drive, among others. Furthermore, computer 2 may also include an interface 34 with one or more networks 36 (e.g., a LAN, a WAN, a wireless network, and/or the Internet, among others) to permit the communication of information with other computers and electronic devices. It should be appreciated that computer 2 typically includes suitable analog and/or digital interfaces between CPU 4 and each of components 6, 14, 34, and 20 as is well known in the art (e.g., via bus 18).

Computer 2 operates under the control of an operating system 12, and executes or otherwise relies upon various computer software applications, components, programs, objects, modules, data structures, etc. Additionally, various applications, components, programs, object, modules, etc. may also execute on one or more processors in another computer coupled to computer 2 via a network, e.g., in a distributed or client-server computing environment, whereby the processing required to implement the functions of a computer program may be allocated to multiple computers over a network.

In particular, an Inventory Management System or IMS 8 may be resident in memory 6 and used to access a Inventory Management System Parts Database or IMS Parts Database 16 resident in mass storage 14. IMS 8 may be used to determine criteria that identify donor vehicles. Additionally, IMS 8 may be used by a user to input data into IMS Parts Database 16 as well as retrieve data from IMS Parts Database 16. Inventory Management System Parts Database 16 may also be accessible by the operating system 12.

An IMS 8 can also be used by a user (e.g., recycler or even a customer) to search for an auto part. For instance, a user can input an auto part he or she is seeking (e.g., selecting the auto part type, selecting a year, and selecting a model) into IMS 8 and IMS 8 will search for the auto part, both indexed and non-indexed auto parts, in database 16. Depending on the type of auto part, the IMS may request additional information or selections from the user. IMS 8 may also display auto parts and/or vehicles matching the criteria determined in IMS 8 for identifying donor vehicles. The Inventory Management System 8 may also have an accounting application 10 associated with it, providing the user the ability to invoice an auto part (e.g., non-indexed auto part) through the accounting program. If no parts nor vehicles are found, IMS 8 may display an indication to the user.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 3:
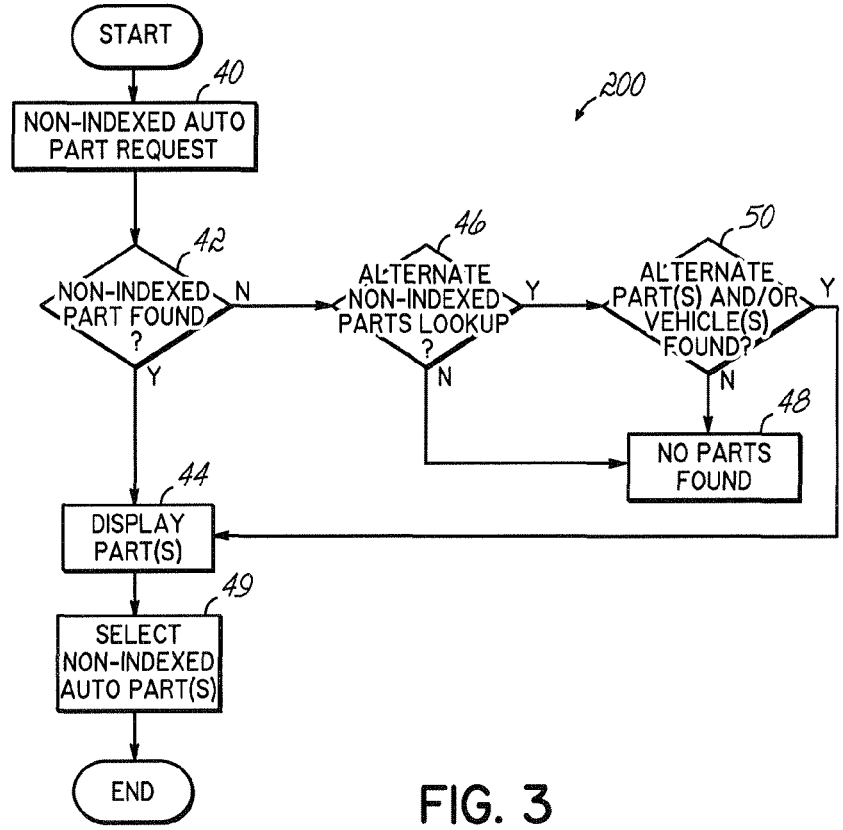
FIG. 3. is a flowchart of another determining criteria routine executed by an Inventory Management System.
Figure 2:
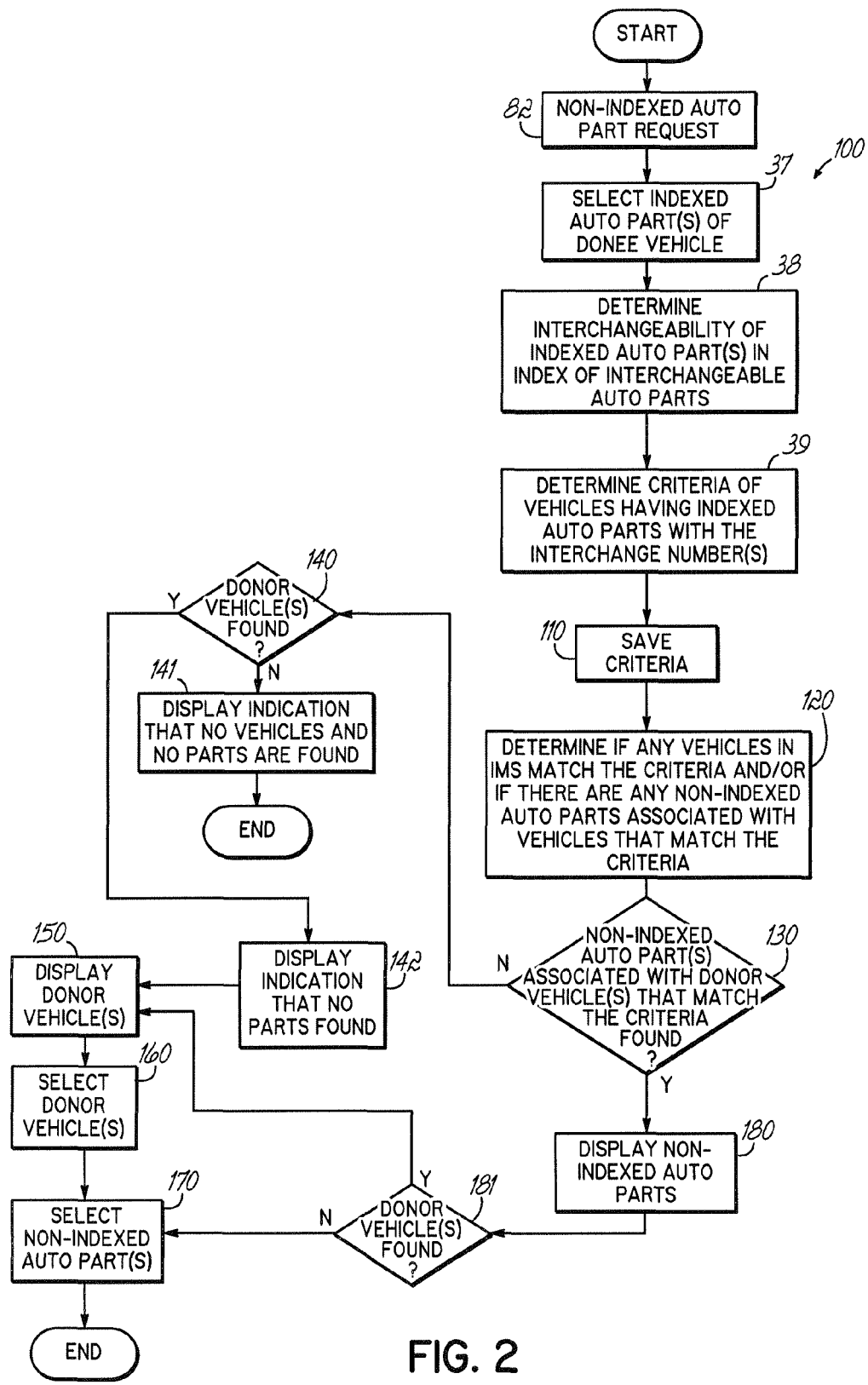
FIG. 2 is a flowchart of a determining criteria routine executed by an Inventory Management System.
Figure 4:
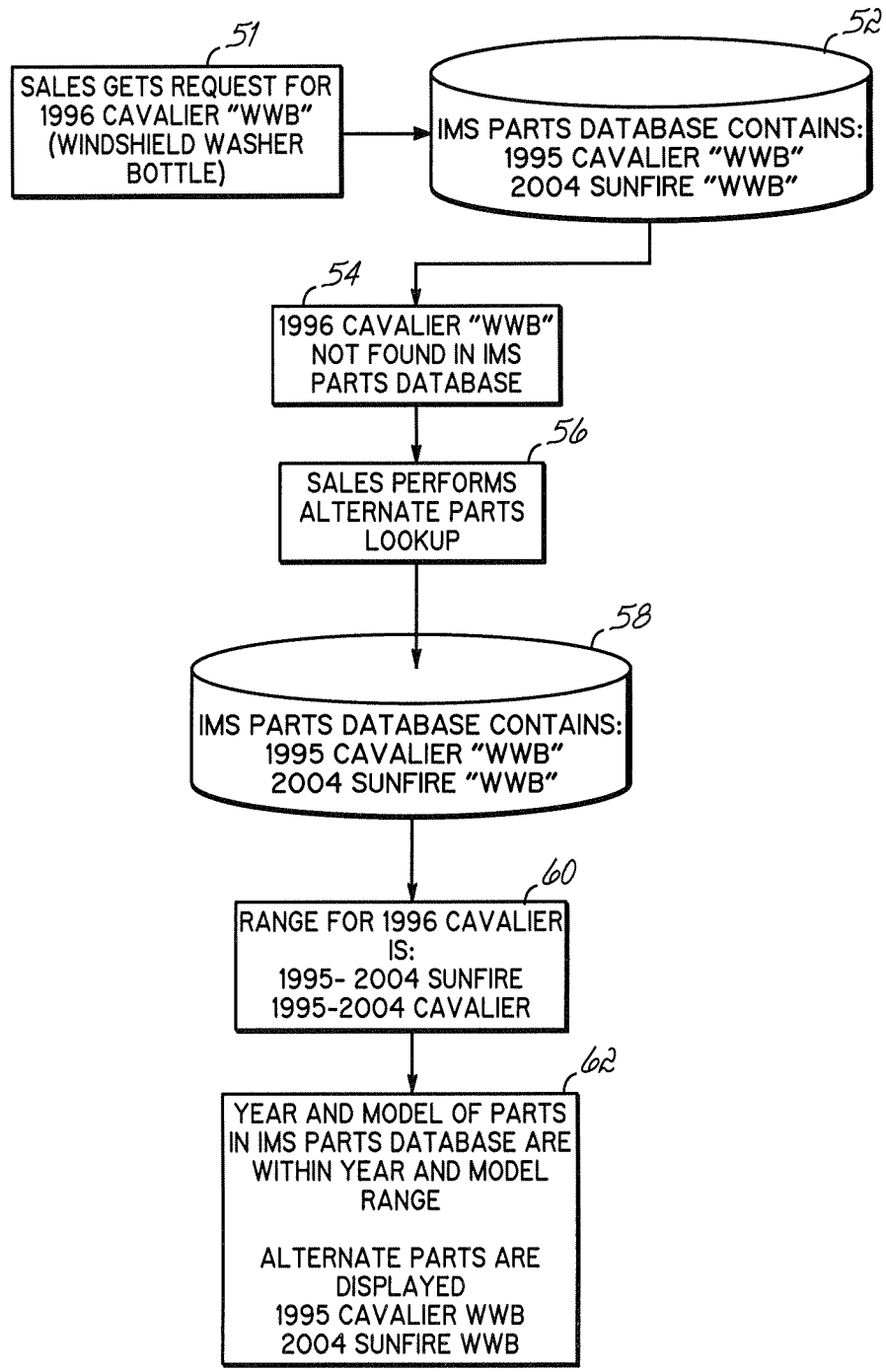
FIG. 4 is a flowchart of an example implementing the determining criteria routine of FIG. 2 or 3.
Figure 5:
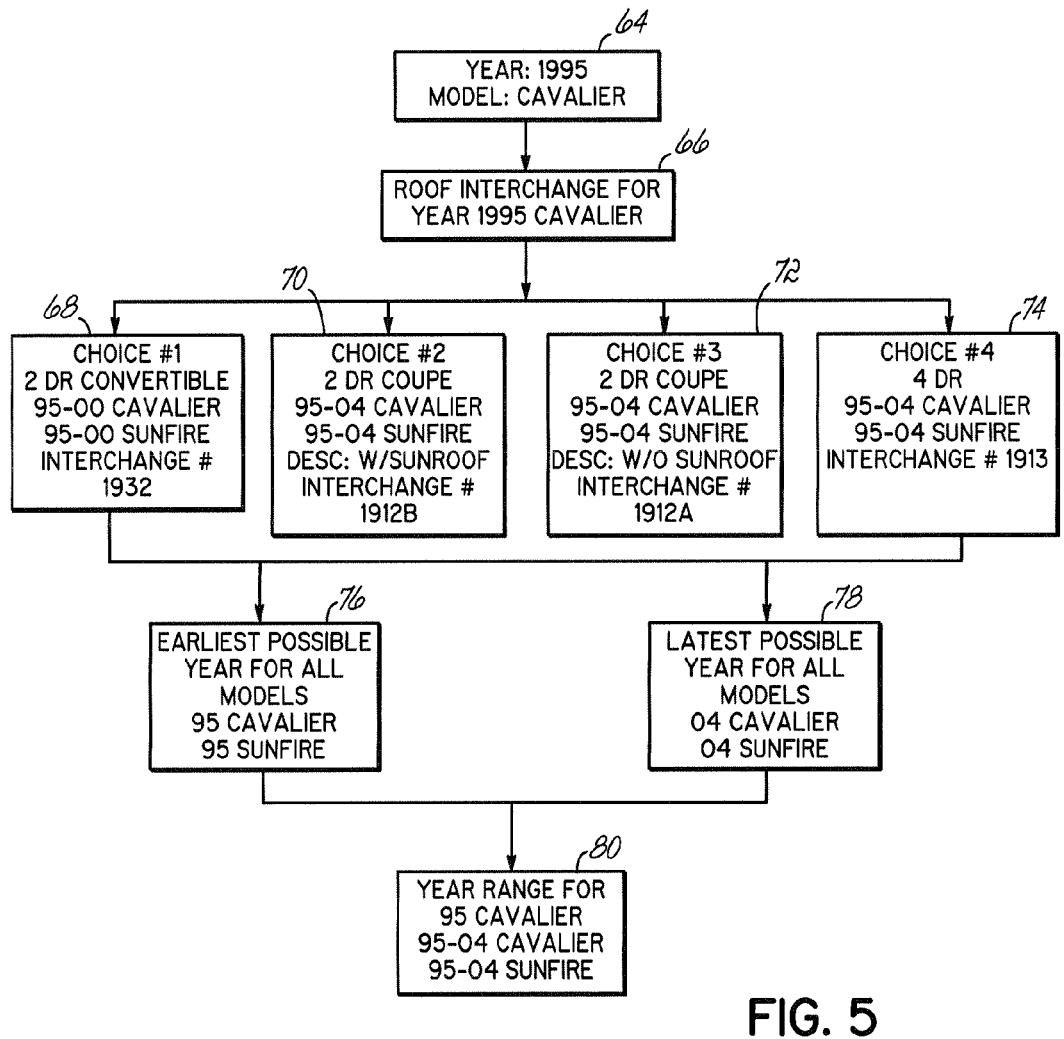
FIG. 5 is a flowchart of an example of a criteria range that can be created based on the determining criteria routine of FIG. 2 or FIG. 3.
Figure 6:
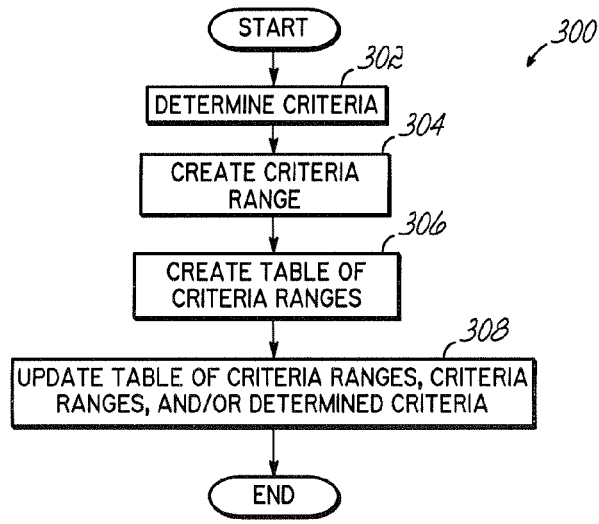
FIG. 6 is a flowchart of a criteria routine executed by an Inventory Management System.

Turning now to FIGS. 2-6, in particular, FIG. 2 illustrates an exemplary routine 100 suitable for use in determining criteria for selecting a donor vehicle. FIG. 3 illustrates another exemplary determining criteria routine 200, that can be adapted from routine 100. FIGS. 4 and 5 illustrate possible examples. FIG. 6 illustrates another criteria routine 300.

Turning to FIG. 2, in block 82, a user may receive a request for a non-indexed auto part (e.g., Windshield Washer Bottle). The request may be, for example, to locate a non-indexed auto part, check the availability a non-indexed auto part and/or purchase a non-indexed auto part. The user may be a recycler, the employees of a recycler, an entity (e.g., a computer), etc., and the request may come from a customer, from a recycler, the employees of a recycler, an entity (e.g., a computer), etc. The user may receive the request verbally (e.g., in person, telephone, etc.) or in writing (e.g., e-mail, fax, etc.). The request may also be transmitted and/or received in an automated manner, for example, a computer may place a request for a non-indexed auto part to another computer. Additionally, the request need not come from another, as the recycler may want to seek a non-indexed auto part. Those of ordinary skill in the art may appreciate that there are various others techniques for conveying and/or receiving a request for a non-indexed auto part and any person or entity may request a non-indexed auto part.

In block 37, at least one indexed auto part is selected of a donee vehicle for which to base routine 100 upon. For example, if a 1995 Chevrolet Cavalier Windshield Washer Bottle (i.e., non-indexed auto part) is requested, the indexed auto part may be selected of a 1995 Chevrolet Cavalier donee vehicle. The donee vehicle and/or the at least one indexed auto part may be selected based upon the year, make, and/or model designations of the non-indexed auto part requested in block 82. The at least one indexed auto part selected may be the roof or another part (e.g. a window shield) or combination of parts. One of ordinary skill in the art may appreciate that both a roof and a window shield may be used, for instance, as a check.

The at least one indexed auto part may also be selected in an automated manner based upon, for example, statistical data such as the past success of using that indexed auto part. Additionally, the user may be able to set his or her preferences and indicate which indexed auto part or parts should be used. The indexed auto part may also be selected, for example, from a drop down menu. On the other hand, the indexed auto may be preselected (e.g., the roof is preselected).

As the name implies, the auto part or parts should be included in an index (e.g., included in the Hollander Interchange Index) as the inclusion in the index is what may allow the interchangeability of the indexed auto part to be determined in block 38. It may be possible that an auto part is included in an index of interchangeable auto parts (e.g., the Hollander Interchange Index) and not another index of interchangeable auto parts. As such an instance, one of ordinary skill in the art would appreciate that the index of interchangeable auto parts in which the part is included should be used.

Next, blocks 38 and 39 utilize the index of interchangeable auto parts to determine criteria that identify donor vehicles having parts interchangeable with the at least one indexed auto part of the donee vehicle. In block 38, the interchange number of an indexed auto part that is interchangeable with the at least one indexed auto part selected in block 37 will be determined from the index of interchangeable auto parts (e.g., Hollander Interchange Index). It is possible that multiple interchange numbers may be available, some of which may be identical and others which may be different to that of the at least one indexed auto part. In determining the interchangeability or the interchange numbers, the year, make, and/or model designations associated with the at least one indexed auto part and/or donee vehicle of which the least one indexed auto part selected would be associated with may be used.

As an example, if a user had a request to locate a non-indexed auto part from a 1995 Chevrolet Cavalier donee vehicle in block 82, then at least one indexed auto part (e.g., roof) of the 1995 Chevrolet Cavalier donee vehicle may be selected in block 37. This example is depicted in FIG. 5 in block 64 and 66 and is referenced in connection with FIG. 2 to facilitate the discussion. Specifically, in block 64, regardless of the non-indexed auto part requested by a customer from a 1995 Cavalier (the make designation may be omitted if the year and/or model designations are sufficiently distinguishing) donee vehicle which a customer may want to buy, an indexed auto part from the 1995 Cavalier donee vehicle such as the roof may be selected as in block 66.

Furthermore, using the Hollander Interchange Index, the interchange for the 1995 Cavalier donee vehicles roof may be conducted in block 66 to produce the interchange numbers in blocks 68, 70, 72, and 74. As such, the four interchange numbers listed in blocks 68, 70, 72, and 74 indicate that the roofs of those vehicles are interchangeable with the 1995 Cavalier roof.

Returning to routine 100 in FIG. 2, in block 39, the criteria including the year, make, and/or model of vehicles that have an indexed auto part that is interchangeable with the at least one indexed auto part selected in block 37 is determined. The criteria will be the year, make, and/or model designations of vehicles that have indexed auto parts with interchange numbers indicating that they are interchangeable with the indexed auto part of block 37.

In block 110, the determined criteria may be saved or even displayed on a display (e.g., computer screen, LCD display panel, etc.) to a user. For instance, the criteria may be saved by the Inventory Management System in the Inventory Management System Parts Database or used to create a criteria ranger or even a table of criteria ranges (discussed further hereinbelow in connection with FIG. 5). Next, block 120, via the IMS, determines whether any vehicles satisfy the criteria in the Inventory Management System Parts Database and/or whether there are any non-indexed auto parts associated with vehicles matching the criteria in the Inventory Management System Parts Database. For example, if a recycler keeps non-indexed auto parts in his IMS Parts Database, it may be easier to search for those non-indexed auto parts that are associated with vehicles matching the criteria. A non-indexed auto part is associated with a vehicle matching the criteria when its from that vehicle, tends to come from that vehicle, has the same designations as that vehicle, etc. For instance, if a 1997 Cavalier vehicle matches the criteria, then a windshield washer bottle from a 1997 Cavalier or designated as a 1997 Cavalier windshield washer bottle can be determined in block 120. The non-indexed auto parts should be of the same type as that requested in block 82. Thus, if a windshield washer bottle was requested in block 82 then block 120 determines if there are any windshield washer bottles in the Inventory Management System Part database of vehicles satisfying the criteria. Practically any conventional techniques for searching records of a database may be used to search the records of the Inventory Management System Parts Database.

Moreover, one of ordinary skill in the art may appreciate that because some recyclers do not include their non-indexed auto parts in their Inventory Management System Part database but some recyclers do include them, therefore, block 120 determines if both vehicles matching the criteria and non-indexed auto parts from vehicles matching the criteria are available. Thus, block 120 as well as any part of routine 100 may be altered and customized. For instance, if a non-indexed auto parts are not included in an Inventory Management System Part Database, then only the availability of vehicles matching the criteria may be determined in block 120 and blocks 140, 141, 150, 160, and 170 should follow. On the other hand, another user may have non-indexed auto parts and vehicles in his or her Inventory Management System Part Database and may prefer a search of both in block 120. And yet, another user may only want non-indexed auto parts available in the Inventory Management System Part database to be determined in block 120 but not vehicles. Routine 100 generally depicts the situation when both vehicles and non-indexed auto parts matching the criteria are determined but can be adapted based upon the user's preferences and/or the information entered in their Inventory Management System Part database.

Next, block 130 inquires as to whether any non-indexed auto parts associated with donor vehicles matching the criteria were found. If not, block 140 queries whether any donor vehicles matching the criteria were found. If not, then an indication that no parts nor vehicles were found may be displayed in block 141 and routine 100 may conclude.

| # | Model | Year | Description | Location | Stock # |
|---|-------|------|-------------|----------|---------|
|   |       |      | No Parts and No Vehicles Found! |   |   |

However, if at least one donor vehicle was found, an indication may be displayed on a display in block 142 that no parts were found. For example, it may be displayed like the following:

| # | Model | Year | Description | Location | Stock # |
|---|-------|------|-------------|----------|---------|
|   |       |      | No Parts Found! |      |         |

Additionally, any donor vehicles stored in the Inventory Management System Parts database matching the criteria may be displayed for a user in block 150. A user may also print, etc.

Again, with reference to FIG. 5, it may be determined that the roof of a 1995 Cavalier donee vehicle is interchangeable with roofs having Interchange Numbers #1932, 1912B, 1912A, and 1913 and the vehicles listed in blocks 68, 70, 72, 74 tend to have roofs with these interchange numbers. The year, make and/or model designations of the vehicles list in blocks 68, 70, 72, and 74 may then form the criteria by which to select donor vehicles. Specifically, based upon the interchange number 1932 from an index of interchangeable auto parts that may include the Hollander Interchange Index, the roof of a 1995 Cavalier may be interchangeable with the roof of a two door Cavalier convertible for the years 1995, 1996, 1997, 1998, 1999, and 2000 and two door Sunfire convertibles for the years 1995, 1996, 1997, 1998, 1999, and 2000. Likewise, based upon the interchange number 1912B, the roof of a 1995 Cavalier may be interchangeable with the roof of a two door Cavalier coup for the years 1995, 1996, 1997, 1998, 1999, 2000, 2001, 2002, 2003, and 2004 even though it has a sunroof and two door Sunfire coups for the years 1995, 1996, 1997, 1998, 1999, 2000, 2001, 2002, 2003, and 2004 even though it has a sunroof. Similarly, based upon the interchange numbers 1912A and 1913, the roof of a 1995 Cavalier may be interchangeable with the roof of a two door Cavalier coupe for the years 1995 through 2004, two door Sunfire coupes for the years 1995 through 2004, four door Cavaliers for the years 1995 through 2002, and four door Cavaliers for the years 1995 through 2004.

As mentioned above, these year and model designations (i.e., the criteria) can then be used to identify donor vehicles matching the criteria and/or auto parts associated with donor vehicles matching the criteria from the Inventory Management System Parts Database. The donor vehicles matching the criteria will generally have a higher probability of having a non-indexed auto part that is interchangeable with the non-indexed auto part sought. In an automated manner, donor vehicles matching the criteria may be selected from the Inventory Management System Part database and may be displayed for a user in block 150. The Vehicle Unit Complete records, descriptive entry that gives the user information about a vehicle such as the year, model, stock number, location, days in inventory, etc., in the database matching the criteria may be displayed on a display. Any identifier may be used. For instance, the following list of VUC may be displayed:

| # | Model | Year | Description | Location | Stock # |
|---|-------|------|-------------|----------|---------|
| 1 | SUNFIR | 04 | SLV,4DR,BLOWN ENGINE | Row 11 | 77361 |
| 2 | SUNFIR | 01 | BLU,4DR,4CYL,HIT FRONT | Row 12 | 82630 |
| 3 | CAVALI | 95 | BLK,Z24,HIT IN | Row 12 | 89002 |

| # | Model | Year | Description | Location | Stock # |
|---|-------|------|-------------|----------|---------|
| 4 | CAVALI | 96 | REAR RED,2DR,4CYL, BASE MODEL | Row 10 | 66214 |

Once displayed, a user may select any donor vehicle or vehicles from the list in block 160 of FIG. 2. The user may physically select a donor vehicle, for example, by choosing one from the list or may inspect some or all the vehicles on the list and select from the inspection, based upon practically any condition such as color, damage, etc. Next, the user may physically select a non-indexed auto part or parts from the donor vehicle in bock 170. The user may select one or more non-indexed auto parts from a donor vehicle because since the donor vehicle satisfies the criteria it may have multiple non-indexed auto parts the user may be interested in aside from the non-indexed auto part requested in block 82. As such, those of ordinary skill in the art may appreciate that routine 100 may not have to be run more than once if a user is interested in multiple non-indexed auto part that are commonly associated with one vehicle (e.g., user wants to purchase a Windshield Washer Bottle, a rearview mirror, and an ashtray for a 1995 Cavalier).

Selection of a non-indexed auto part or parts in block 170 may involve the use of mechanical equipment and the like. Additionally, in some embodiments the selection of a donor vehicle(s) and/or non-indexed auto part(s) may be automated and may be done completely by the IMS or other computer. For instance, the selection of a vehicle that satisfies the criteria may be based upon a predetermined condition such as the damage of the donor vehicle. Furthermore, the selection of an non-indexed auto part in block 170 may also be automated and select a non-indexed auto part based upon a predetermined condition such as the damage of the donor vehicle containing the non-indexed auto part and/or the price a part. A robotic arm may even be used to retrieve the non-indexed auto part that was selected based upon a predetermined condition.

Thus, selection of donor vehicle(s) in block 160 and/or non-indexed auto part(s) in block 170 may be accomplished solely by human intervention, solely in an automated manner (e.g., via computers, robotic arms, and the like), and may also be accomplished by a mixture of the two (i.e., both human intervention and automated techniques may be used). Practically any selection may be used to obtain a non-indexed auto part. Next, routine 100 may conclude.

Returning to block 130, if a non-indexed auto part requested is found in the Inventory Management System Part database from a vehicle matching the criteria, then block 180 may display the indexed auto part(s) included in the Inventory Management System Part Database. Any identifier may be used. It may be displayed on a display as follows:

| # | Model | Year | Description | Location | Stock # |
|---|-------|------|-------------|----------|---------|
|   |       |      | ---Alternate Parts Found--- |  |  |
| 1 | SUNFIR | 04 | Complete Washer Bottle | Row 11 | 77361 |
| 2 | CAVALI | 95 | Complete Washer Bottle | Row 12 | 89002 |

As donor vehicles may be available, block 181 determines if there are any. If so, control passes to blocks 150, 160, and 170 as described hereinabove. If not, control passes to block 170 where a non-indexed auto part(s) may be selected. Selection of non-indexed auto part(s) in block 170 may be accomplished solely by human intervention, solely in an automated manner (e.g., via computers, robotic arms, and the like), and may also be accomplished by a mixture of the two (i.e., both human intervention and automated techniques may be used). Next, routine 100 may conclude.

The remainder of FIG. 5, blocks 76, 78, and 80, illustrate a further step that may be taken to increase the chances of finding a non-indexed auto part sought. Specifically, the minimum and maximum values may be determined from the criteria determined in blocks 68, 70, 72, and 74. As stated in block 76, the minimum or earliest possible years for all models of blocks 68, 70, 72, and 74 is 1995 for Cavalier and 1995 for Sunfire, irrespective of weather the vehicle has a sunroof or no sunroof, whether it is a convertible, whether it has two doors or four doors, etc. Similarly, block 78 illustrates that the maximum or latest possible years for all models of blocks 68, 70, 72, and 74 is 2004 for Cavalier and 2004 for Sunfire. As such, a criteria range of 1995-2004 for Cavalier and a range of 1995-2004 for Sunfire be created to increase the pool of vehicles that can match the criteria range. Criteria ranges may also facilitate the implementation, which may generally be the same. Referring to block 80, vehicles matching any of the two ranges may have the highest probability of containing a non-indexed auto part sought. As such, one of ordinary skill in the art may appreciate that the ranges may be used to determine even more criteria of donor vehicles and increase the possibilities of finding a donor vehicle with a non-indexed auto part sought.

Turning next to FIG. 3, FIG. 3 illustrates a routine that may adapted from routine 100 in FIG. 2. Routine 200 in FIG. 3 is similar to routine 100 in FIG. 2 in some aspects. The primary difference between the two routines are blocks 42 and 46. Specifically, once a request for a non-indexed auto part (e.g., Windshield Washer Bottle) is made in block 40, then the user may conduct a search for the non-indexed auto part requested in block 42 in Inventory Management System 8. If the non-indexed auto part is found, then the non-indexed auto part or parts may be displayed (e.g., a CRT monitor, an LCD display panel, etc.) in block 44. As part of the search, the user may type the year, make, and/or model of the non-indexed auto part requested (e.g., 1995, Chevrolet, Cavalier Wind Shield Washer bottle) into fields of an Inventory Management System 8, and the Inventory Management System 8 may then search for an auto part matching the non-indexed auto part (e.g., 1995, Chevrolet, Cavalier Wind Shield Washer bottle) and/or vehicle (e.g., 1995, Chevrolet, Cavalier) with the same year, make, and/or model as the non-indexed auto part. If any 1995 Chevrolet Cavalier Windshield Washer bottles or vehicles are found these may be displayed to the user in block 45.

However, if the non-indexed auto part is not found in block 42, then block 46 determines whether the user would like an alternate non-indexed auto part lookup and/or donor vehicle lookup. For instance, a customer may simply not want to use interchangeable parts. In such a case, the user may be prompted as to this inquiry and if he or she does not want the alternate non-indexed part nor donor vehicle lookup (i.e., search) conducted, then an indication that not parts were found may be displayed in block 48. Otherwise, if the user does want an alternate non-indexed auto part lookup and/or donor vehicle lookup, then practically the same steps may be carried out as in routine 100 of FIG. 2 to select a indexed auto part of a donee vehicle, determine the criteria, determine donor vehicles matching the criteria and/or non-indexed auto parts associated with donor vehicles matching the criteria, etc. (described in connection with FIG. 2). If any are found they may be displayed on a display in block 44 and the non-indexed auto part or parts may be selected in block 49. If not, an indication may be displayed that no parts nor vehicles were found in block 48.

A differences between routine 100 and routine 200 is that two searches may be performed in routine 200. Furthermore, as the first search is based on the year, model, and/or make associated with the non-indexed auto part requested, the determined criteria may omit this same year, model and make configuration in the second search of routine 200 as it has already been searched unsuccessfully. For instance, if the non-indexed auto part is from a 1995 Chevrolet Cavalier donee vehicle, then 1995 Chevrolet Cavalier may be omitted from the determined criteria but not 1996 Chevrolet Cavalier, etc.

FIG. 4 illustrates a flowchart of an example implementing the determining criteria routine 100 of FIG. 2 and/or routine 200 of FIG. 3. In block 51, a user from a sales department such as a recycler or other employee receives a request for a 1996 Cavalier windshield washer bottle (WWB) and conducts a search via the Inventory Management System for the non-indexed auto part. In block 52, the Inventory Management System searches the Inventory Management System Parts Database for a 1996 Cavalier windshield washer bottle but only a 1995 Cavalier windshield washer bottle and a 2004 Sunfire windshield washer bottle are found. As such, a 1996 Cavalier windshield washer bottle is not found in block 54. An indication that the 1996 Cavalier windshield washer bottle was not found may also be displayed in block 54. In block 56, the user from the sales department conducts an alternate non-indexed part search to determine the criteria of vehicles having the highest probability of having the non-indexed 1996 Cavalier windshield washer bottle sought. Although the Inventory Management System Parts Database only has a 1995 Cavalier WWB and a 2004 Cavalier WWB (block 58), the range of criteria of donor vehicles depicted in block 60, based upon the minimum and maximum of years of models determined from the interchangeability an indexed auto part (e.g., roof) of a 1996 Cavalier, indicates that donor vehicles having criteria in the range 1995-2004 Sunfire and/or 199-2004 Cavalier have the highest probability of having a WWB that is interchangeable with the 1996 WWB sought. Furthermore, as the two WWB in the database are from vehicles that fit this criteria, they may be displayed in block 62. Additionally, if the database had any donor vehicle(s) matching criteria in those ranges, these could be displayed as well.

Determining the range of criteria is generally depicted in FIG. 5 and described hereinabove in connection with FIG. 2. Furthermore, a table may be made that could be implemented into the Inventory Management System. For instance, a criteria range may be determined for every possible vehicle listed in an Interchange Database that have an interchange number for their roof, and the criteria range table may be incorporated into the Inventory Management System. As such, the table may be relied upon instead of redetermining the criteria each time a non-indexed auto part is sought by a customer. Once implemented, a user could search for a non-indexed auto part, non-indexed auto parts of donor vehicles matching the criteria in the table and/or donor vehicles matching the criteria in the table in the IMS Parts Database may be determined, and identifiers for the non-indexed auto parts of donor vehicles matching the criteria in the table and/or donor vehicles matching the criteria in the table may be displayed on a display. Displaying may be optional in some embodiments and based upon a user performing an action (e.g., input of a preselected set of key strokes, clicking a mouse, etc.). At that point, if there are any parts or VUC's matching, those parts or VUC's would be displayed, bettering a user's chance of making a sale.

Additionally, once created, the table may be updated. For instance, when new vehicles are introduced, the criteria ranges in the table may be updated to reflect the newly introduced vehicles. Updating the table may be done in an automated manner. For instance, when the index of interchangeable auto parts is updated the changes in the index may trigger an update of the table. The update may also be done manually. After its updated, it may be incorporated into the IMS and used to identify donor vehicles and/or auto parts associated with donor vehicles, to display, etc. as described hereinabove. Similarly, criteria ranges and determined criteria may be updated.

FIG. 6 depicts a routine 300 that illustrates this. Starting with block 302, criteria for selecting donor vehicles is determined as described in connection with routines 100 and 200. Next, at least one criteria range may be created in block 304 using the minimum and maximum values of the determined criteria. Next, at least one table of criteria ranges may be created in block 306. And in block 308, the table of criteria ranges, criteria ranges, and/or determined criteria may be updated.

Those of ordinary skill in the art will appreciate that there may be varies manners of updating. For instance, it may be beneficial to review the generated table (or review an index if implemented as such) for adjustments after it has been updated (or even prior to being updated) as it may be desired from time to time to make a manual entry to adjust the index. For example, after updating the index, we may find that the year range for a Chevy Cavalier is 1982-1994. Although this index may be appropriate as the roofs are the same for this year range, a user may decide that due to some major differences in other parts, that the year range would be better stated as 1982-1987. This adjustment may be carried out by setting up a table that can be manually edited that will override the logic that builds the year range. Thus, this exception table can be utilized to change the entry. The adjustment decisions may be based upon industry knowledge.

Various modifications may be made to the illustrated embodiments without departing from the spirit and scope of the invention. Therefore, the invention lies in the claims hereinafter appended.

What is claimed is:

1. A computer implemented method for determining criteria of a donor vehicle likely to contain a non-indexed auto part that is interchangeable with a non-indexed auto part on a donee vehicle, wherein the non-indexed auto parts are not included in an index of interchangeable auto parts, the method comprising:
in a computer including a hardware-based processor;
selecting at least one indexed auto part of the donee vehicle that is included in said index of interchangeable auto parts; and
utilizing said index of interchangeable auto parts to determine criteria that identify donor vehicles having indexed auto parts interchangeable with the at least one indexed auto part of the donee vehicle to utilize the interchangeability of the indexed auto part of the donee vehicle in said index of interchangeable auto parts to indirectly assist with interchangeability of the non-indexed auto part of the donee vehicle, the criteria including at least one of a year designation, a make designation, or a model designation.

2. The computer implemented method of claim 1 utilized in obtaining a non-index auto part from a donor vehicle further comprising,
selecting a donor vehicle matching the criteria determined using the method of claim 1, and
selecting the non-index auto part from the donor vehicle.

3. The computer implemented method of claim 1, wherein the indexed auto part is a roof.

4. The computer implemented method of claim 1, wherein the index of interchangeable auto parts includes a Hollander Interchange Index.

5. The computer implemented method of claim 1, wherein the donor vehicles have a non-indexed auto part that is interchangeable with a non-indexed auto part of the donee vehicle.

6. The computer implemented method of claim 1, further comprising determining whether there is a donor vehicle matching the criteria determined using the method of claim 1.

7. The computer implemented method of claim 1, further comprising displaying an identifier of a donor vehicle matching the criteria determined using the method of claim 1 on a display.

8. The computer implemented method of claim 1, further comprising determining whether there is a non-indexed auto part associated with a donor vehicle matching the criteria determined using the method of claim 1.

9. The computer implemented method of claim 1, further comprising displaying an identifier of a non-indexed auto part associated with a donor vehicle matching the criteria determined using the method of claim 1 on a display.

10. The computer implemented method of claim 1, further comprising displaying the determined criteria on a display.

11. The computer implemented method of claim 1, further comprising saving the determined criteria.

12. The computer implemented method of claim 1, further comprising creating a criteria range from the determined criteria.

13. The computer implemented method of claim 12, further comprising creating a table of criteria ranges.

14. The computer implemented method of claim 13, further comprising determining whether there is a donor vehicle matching a criteria range of the table of criteria ranges.

15. The computer implemented method of claim 13, further comprising displaying a donor vehicle matching a criteria range of the table of criteria ranges.

16. The computer implemented method of claim 13, further comprising determining whether there is a non-indexed auto part associated with a donor vehicle matching a criteria range of the table of criteria ranges.

17. The computer implemented method of claim 13, further comprising displaying a non-indexed auto part associated with a donor vehicle matching a criteria range of the table of criteria ranges.

18. The computer implemented method of claim 13, further comprising updating the table of criteria ranges.

19. The computer implemented method of claim 18, wherein the table of criteria ranges is updated at least partially in an automated manner.

20. The computer implemented method of claim 1, wherein the indexed auto part is a window shield.

21. An apparatus, comprising:
(a) a hardware-based processor;
(b) a memory; and
(c) program code configured to be executed by the processor to determine criteria of a donor vehicle likely to contain a non-indexed auto part that is interchangeable with a non-indexed part on a donee vehicle, wherein the non-indexed auto parts are not included in an index of interchangeable auto parts, by selecting at least one indexed auto part of the donee vehicle that is included in said index of interchangeable auto parts and by utilizing said index of interchangeable auto parts to determine criteria that identify donor vehicles having indexed auto parts interchangeable with the at least one indexed auto part of the donee vehicle to utilize the interchangeability of the indexed auto part of the donee vehicle in said index of interchangeable auto parts to indirectly assist with interchangeability of the non-indexed auto part of the donee vehicle, the criteria including at least one of a year designation, a make designation, or a model designation.

22. The apparatus of claim 21 utilized in obtaining a non-index auto part from a donor vehicle wherein the program code is further configured to select a donor vehicle matching the criteria determined using the apparatus of claim 21, and select the non-index auto part from the donor vehicle.

23. The apparatus of claim 21, wherein the indexed auto part is a roof.

24. The apparatus of claim 21, wherein the index of interchangeable auto parts includes a Hollander Interchange Index.

25. The apparatus of claim 21, wherein the donor vehicles have a non-indexed auto part that is interchangeable with a non-indexed auto part of the donee vehicle.

26. The apparatus of claim 21, wherein the program code is further configured to determine whether there is a donor vehicle matching the criteria determined using the apparatus of claim 21.

27. The apparatus of claim 21, wherein the program code is further configured to display an identifier of a donor vehicle matching the criteria determined using the apparatus of claim 21 on a display.

28. The apparatus of claim 21, wherein the program code is further configured to determine whether there is a non-indexed auto part associated with a donor vehicle matching the criteria determined using the apparatus of claim 21.

29. The apparatus of claim 21, wherein the program code is further configured to display an identifier of a non-indexed auto part associated with a donor vehicle matching the criteria determined using the apparatus of claim 21 on a display.

30. The apparatus of claim 21, wherein the program code is further configured to display the determined criteria on a display.

31. The apparatus of claim 21, wherein the program code is further configured to save the determined criteria.

32. The apparatus of claim 21, wherein the program code is further configured to create a criteria range from the determined criteria.

33. The apparatus of claim 32, wherein the program code is further configured to create a table of criteria ranges.

34. The apparatus of claim 33, wherein the program code is further configured to determine whether there is a donor vehicle matching a criteria range of the table of criteria ranges.

35. The apparatus of claim 33, wherein the program code is further configured to display a donor vehicle matching a criteria range of the table of criteria ranges.

36. The apparatus of claim 33, wherein the program code is further configured to determine whether there is a non-indexed auto part associated with a donor vehicle matching a criteria range of the table of criteria ranges.

37. The apparatus of claim 33, wherein the program code is further configured to display a non-indexed auto part associated with a donor vehicle matching a criteria range of the table of criteria ranges.

38. The apparatus of claim 33, wherein the program code is further configured to update the table of criteria ranges.

39. The apparatus of claim 38, wherein the table of criteria ranges is updated at least partially in an automated manner.

40. The apparatus of claim 21, wherein the indexed auto part is a window shield.

41. A program product, comprising:

(a) program code configured upon execution by a hardware-based processor to determine criteria of a donor vehicle likely to contain a non-indexed auto part that is interchangeable with a non-indexed auto part on a donee vehicle, wherein the non-indexed auto parts are not included in an index of interchangeable auto parts, by selecting at least one indexed auto part of a donee vehicle that is included in said index of interchangeable auto parts and by utilizing said index of interchangeable auto parts to determine criteria that identify donor vehicles having indexed auto parts interchangeable with the at least one indexed auto part of the donee vehicle to utilize the interchangeability of the indexed auto part of the donee vehicle in said index of interchangeable auto parts to indirectly assist with interchangeability of the non-indexed auto part of the donee vehicle, the criteria including at least one of a year designation, a make designation, or a model designation; and (b) a recordable type computer readable medium storing the program code.

\* \* \* \* \*